United States Patent [19]
Kopp et al.

[11] Patent Number: 5,470,595
[45] Date of Patent: Nov. 28, 1995

[54] METHOD AND SYSTEM FOR PROCESSING CHEESE

[75] Inventors: Gabriele M. Kopp, Munich; Erich Laudenbach, Starnberg; Ahmet Anbarci, Unterhaching, all of Germany

[73] Assignee: Kraft General Foods R&D, Inc., Rye Brook, N.Y.

[21] Appl. No.: 200,120

[22] Filed: Feb. 22, 1994

[51] Int. Cl.$^6$ ............................ A23C 19/00; G01N 22/00
[52] U.S. Cl. .................. 426/231; 73/73; 99/453; 99/468; 99/486; 426/582
[58] Field of Search .................... 426/231, 582; 99/453, 455, 468, 486, 325, 452, 489; 73/73

[56] References Cited

U.S. PATENT DOCUMENTS

| | | | |
|---|---|---|---|
| 3,966,973 | 6/1976 | Henry et al. | 426/231 |
| 4,112,131 | 9/1978 | Bosy et al. | 426/582 |
| 4,680,181 | 7/1987 | Leavitt et al. | 426/36 |
| 4,689,234 | 8/1987 | Ernstrom et al. | 426/38 |
| 4,727,311 | 2/1988 | Walker | 324/58.5 A |
| 4,991,915 | 2/1991 | Thompson et al. | 73/73 |
| 5,104,675 | 4/1992 | Callahan et al. | 426/582 |
| 5,165,945 | 11/1992 | Yee et al. | 426/36 |
| 5,215,778 | 1/1993 | Davison et al. | 426/582 |
| 5,240,724 | 8/1993 | Otto et al. | 426/582 |

FOREIGN PATENT DOCUMENTS

| | | | |
|---|---|---|---|
| 0038254 | 10/1981 | European Pat. Off. | |
| 0440208 | 7/1991 | European Pat. Off. | |
| 2000012 | 7/1971 | Germany . | |
| 642824 | 5/1984 | Switzerland | 426/231 |
| 826227 | 4/1981 | U.S.S.R. | 426/231 |
| WO9102966 | 3/1991 | WIPO . | |

OTHER PUBLICATIONS

Brochure titled "Microwave Moisture Analyzer LB 354 Micro–Moist," published by EG & G Berthold, Germany, Sep. 1992.
Database WP1 Week 84.14; Derwent Publ. Ltd., London, AN 84–87433, SO–A–1 024 836 (Altai Buttercheese).
Database WP1 Week 9014 1990; Derwent Publ. Ltd., London AN 90–103080 & JP–A 02 053 439 (Snow Brand Milk Products).

*Primary Examiner*—George Yeung
*Attorney, Agent, or Firm*—Joyce P. Hill; Thomas R. Savoie; Thomas A. Marcoux

[57] ABSTRACT

A method and system for processing cheese. The method comprises the steps of blending ground cheese with additional ingredients to form a blended cheese material, and cooking and then cooling that cheese material. The method further comprises the steps of measuring a moisture content of the blended cheese material, generating a signal representing that moisture content, and adjusting the moisture content of the blended cheese material to a preset level in response to the generated signal. The moisture content of the cheese product may be measured at any appropriate stage of the processing line. Preferably, the moisture content of the cheese material is measured by transmitting microwave signals across the cheese material, and measuring the phase shift in the transmitted microwave signals. Also, preferably, the moisture content of the cheese material is measured, and any necessary adjustments made, after that material has been cooked and cooled.

29 Claims, 7 Drawing Sheets

METHOD AND SYSTEM FOR PROCESSING CHEESE

BACKGROUND OF THE INVENTION

This invention generally relates to methods and systems for processing cheese products, and more specifically, to controlling the moisture content of cheese products as those products are being processed.

Processed cheese products typically are prepared by forming a blend of one or more comminuted natural cheeses, together with various additives such as whey or emulsifying salts. The processed cheese products are produced by heating, melting, and mixing the cheese blend to form a homogenous emulsified molten mass, followed by cooling and solidification of the molten mass. Such processing, for example, with emulsifying salts such as sodium phosphate and/or sodium citrate in amounts of 2–3 wt. % permits manufacture of soft-bodied, easily meltable processed cheeses and processed cheese foods.

Because of their molten, easily handled form, processed cheese products may be readily packaged to provide convenient consumer products. Packaging may take any one of a number of forms such as hot packing in a plastic film tube that is cross-sealed and cut to provide individually wrapped slices. The molten process cheese product may also be formed into slices by distributing a thin layer of the product upon the surface of a cooled rotating chill roll, solidifying that layer into a sheet and removing the sheet from the roll. The sheet is then cut into strips and subsequently into slices, followed by packaging of the sliced processed cheese product.

Various prior art methods and systems for processing cheese or cheese products are disclosed, for example, in U.S. Pat. Nos. 5,165,945, 5,104,675, and 4,689,234. U.S. Pat. No. 5,165,945 discloses a process in which milk clotting enzymes are introduced into a feed stock containing cheese ingredients, and the enzyme-treated feed stock is heated to produce a desired body, texture, and solids level. U.S. Pat. No. 5,104,675 discloses a process for preparing cheese products on a continuous in-line basis by providing a uniform blend of specific types of natural mozzarella and cheddar cheeses with limited amounts of sodium citrate. U.S. Pat. No. 4,689,234 discloses a process for producing cheese, in which milk is initially concentrated by ultrafiltration and diafiltration to obtain a desired buffer capacity to lactose ratio in the retentate. A lactic acid producing starter culture is then inoculated into the retentate, and the retentate is then fermented to obtain a desired final pH.

The moisture content of the final cheese product is a key parameter, having a significant effect on the quality and cost of the product. Controlling that moisture content is complicated by the fact that, conventionally, water is added to and removed from the cheese blend at various points in the manufacturing process, and the amounts of water that are added to and removed from the cheese blend at these points are not always precisely controlled.

For instance, in a common process, water is added while the comminuted natural cheeses and the additives are blended. The blended mixture is cooked to a target temperature by the direct injection of steam either continuously into a pipework or batchwise into a vessel containing the mixture. After a product-specific holding time at the target temperature, the cooked cheese product is cooled by the direct flashing of steam from the cheese product. The amount of water that is added to the cheese product during the blending step can be controlled relatively precisely. However, similar precise controls cannot be exercised over the amounts of water that are absorbed by and subsequently drawn out from the cheese product during the above-mentioned cooking and cooling steps.

With prior art processes, the moisture content of the final product can be controlled to within a range of plus or minus 2% of a target value, depending on the product type, the manufacturing equipment, the raw material, and other factors; and generally, these processes produce excellent products. Nevertheless, it is believed that the cost of the processes can be reduced and the uniformity of the product quality can be improved by narrowing the above-mentioned moisture range.

SUMMARY OF THE INVENTION

The present invention relates to a method and system for processing cheese. The method comprises the steps of blending ground cheese with additional ingredients to form a blended cheese material, and cooking and then cooling that cheese material. The method further comprises the steps of measuring a moisture content of the blended cheese material, generating a signal representing that moisture content, and adjusting the moisture content of the blended cheese material to a preset level in response to the generated signal.

The present invention may be embodied with conventional cheeses and with conventional cooking and cooling means and steps. Preferably, the moisture content of the cheese material is measured by transmitting microwave signals across the cheese material, and measuring the phase shift in the microwave signals, which correlates to the amount of moisture in the cheese material. Also, preferably, the moisture content of the cheese material is measured, and any necessary adjustments made, after that material has been cooked and cooled.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
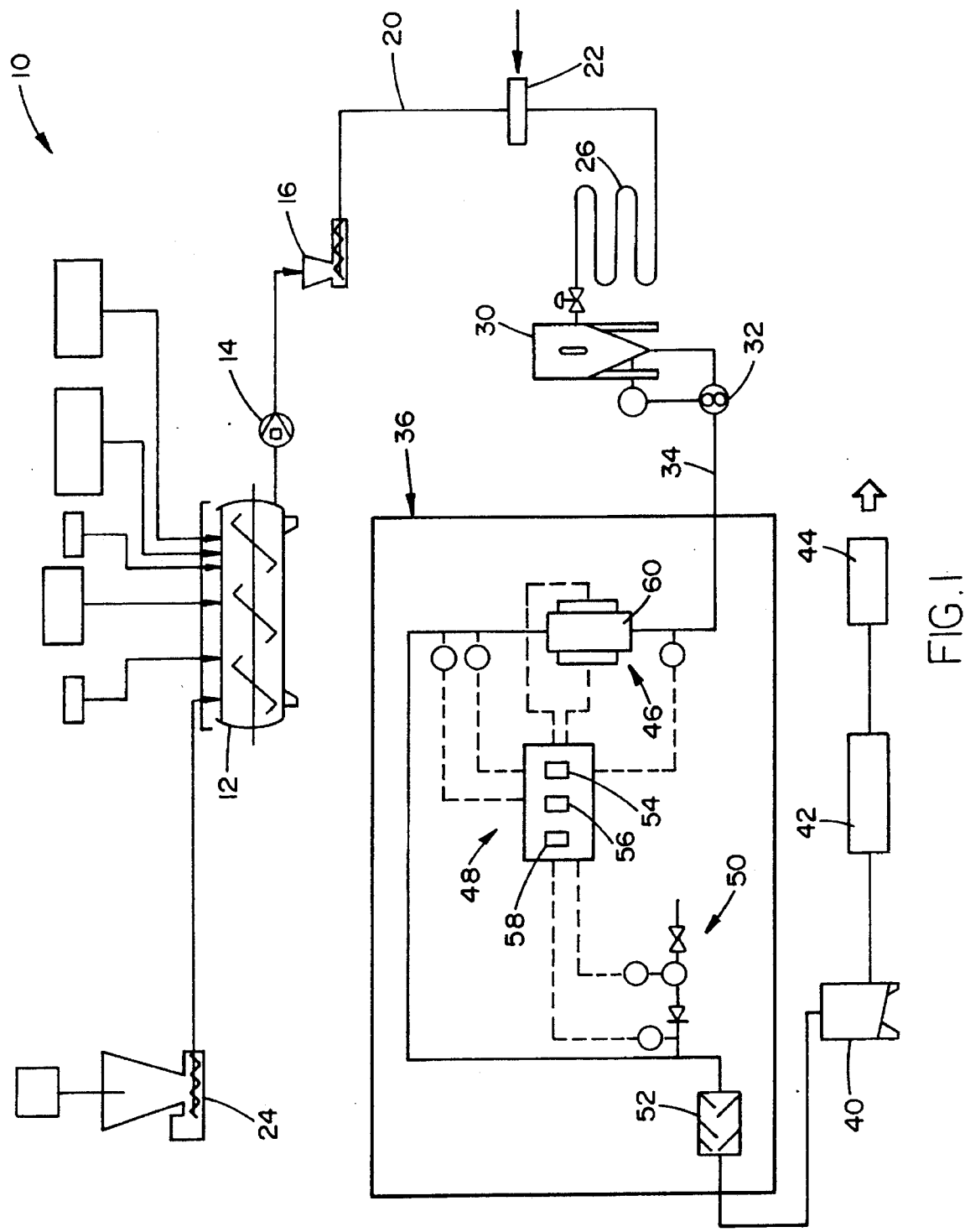
FIG. 1 is a schematic diagram of a cheese processing system, of the type utilizing a continuous cooking system, embodying the present invention.

Referring now to FIG. 1, there is illustrated a schematic flow diagram of a continuous cooking system 10 for processing cheeses and embodying the present invention. A plurality of cheese components and additives are fed via conventional conveying/transport systems into blender 12, which is utilized to provide a homogeneous raw material mixture in proper condition for cooking. This mixture is then fed, via discharge pump 14, augure pump 16, and line 20, to cooking subsystem 22.

Any suitable cheese components and additives may be used in system 10, and the composition of the mixture in blender 12 depends on the formulation of the final processed cheese product. That mixture may include, for example, cheddar cheese, mozzarella cheese, enzyme-modified cheese flavor materials, sodium citrate, as well as other ingredients. Preferably, the cheese components of that mixture are comminuted in grinder 24 before being conveyed to blender 12.

Also, any suitable mixer or blender may be used in system 10. In FIG. 1, a single blender 12 is shown for mixing the ingredients, but it is to be understood that additional blenders may be utilized to provide a raw material in proper condition for cooking. For example, in a preferred embodiment of the invention, at least two mixers are used alternately to feed the raw material mixture to the continuous cooking system 22.

The continuous cooking system 22 may have any design suitable for direct injection of steam into the raw material mixture providing condensation of steam and thus a fast heating and melting of the cheese material. With the embodiment of system 10 shown in FIG. 1, the continuous cooking subsystem 22 receives steam from a suitable source through a line and a control valve (not shown). A temperature sensing device (not shown) may be utilized with a conventional system to control the amount of steam conducted into cooking system 22 to maintain a target temperature of the cooked product, which may be in the range of 85° C. to 140° C. If the target temperature is high and cannot be achieved using only one continuous cooking stage, then a second cooking stage (not shown), arranged in series with the first stage, may be used for injection of steam in order to elevate the product temperature to the target.

From cooking subsystem 22, the molten mass is delivered through a holding pipe 26 to a flash tank 30, which is maintained at a pressure lower than the pressure in the steam injector 22 and the holding pipe 26. When the molten mass is delivered into flashtank 30, the rapid reduction in pressure causes a portion of the water contained in that mass to be vaporized, thereby reducing the temperature of the molten mass. A further effect in flash tank 30 is deaeration of that molten mass.

Flash tank 30 is kept at a low pressure, generally referred to as a vacuum, depending on the target cooling temperature; and the flash tank is connected by a conduit to a condenser, which functions to provide the vacuum for the deaerator. The vacuum may be maintained at the desired level by means of a vacuum control circuit (not shown), which may be of a conventional design, including a sensor and a vacuum controller that controls a valve in a vacuum line.

From flash tank 30, the molten mass is pumped, via discharge pump 32, through conduit 34, which carries the mass through moisture measuring and control subsystem 36 and to balance tank 40. From tank 40, the molten mass is conducted to filling station 42 and thence to palletizer 44. Preferably, the viscous molten cheese mass is delivered to filling station 42 at a temperature of 65°–76° C., and the cheese mass may be packaged at that station in any suitable form. For example, the product may be filled into conventional single slice inner wrap and over wrap packaging systems or in tub forms.

Moisture control subsystem 36 is provided to measure and monitor the moisture content of the blended cheese material and preferably, if desired, to adjust the moisture content of that material to a preset level. The moisture measurement and the adjustment of the moisture content of the blended cheese material, may be done at any appropriate stage or stages of the cheese processing line. Preferably, though, as represented in FIG. 1, subsystem 36 is used to measure and to adjust the moisture content of the blended cheese product after cooling and prior to filling station 42. In addition, subsystem 36 may be used to divert product that is outside a given or determined moisture range, so that such product is not filled and packaged.

The preferred embodiment of subsystem 36 includes measuring means 46, control means 48, liquid dosing means 50, and mixing device 52; and control means 48 includes signal processing means 54, control signal generating means 56, and dosing control means 58. Generally, measuring means 46 provides an output signal representing the moisture content of the cheese product in conduit 34, and in particular in a measuring cell 60 that is disposed in that conduit. This signal is conducted to signal processing means 54 that produces an adjusted output signal, depending on the temperature and pressure of the material in line 34. This adjusted output signal is conducted to control signal generating means, which then generates an output signal representing the difference between the desired and actual moisture contents of the cheese product. This latter signal is applied to means 58, which then generates a signal that operates liquid dosing means to adjust the moisture content of the cheese product.

Processing line or system 10 illustrated in FIG. 1 and described above operates on a continuous basis, so that cheese products are continuously moving through all subsystems for cooking 22, holding 26, cooling 30, moisture control 36, and filling 42.

Figure 2:
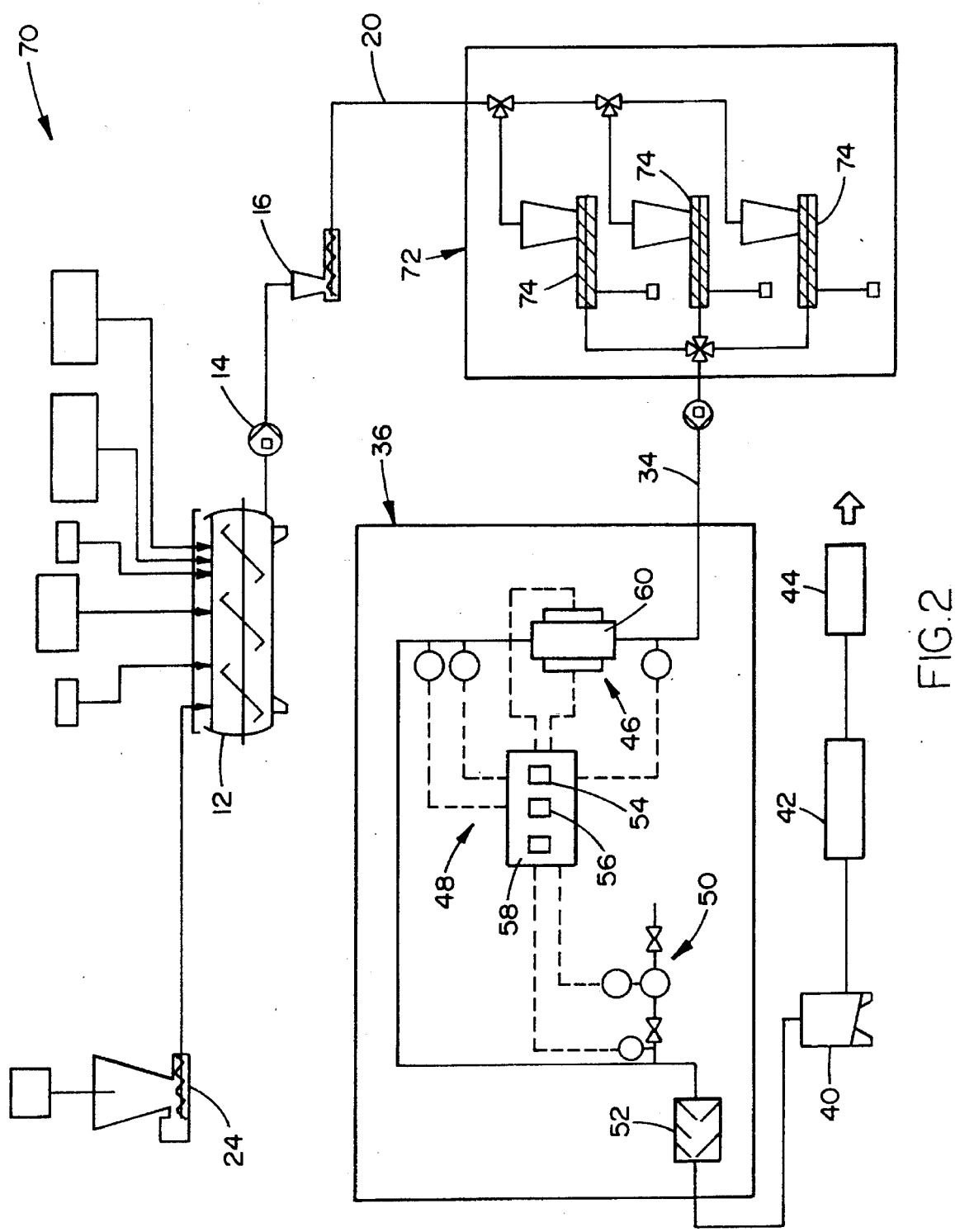
FIG. 2 is a schematic diagram of an alternate cheese processing system, of the type having a batch cooking system, also embodying the present invention.

The present invention may also be embodied in a batch processing system, and FIG. 2 illustrates one example of such a batch processing system 70. Systems 10 and 70 have many identical components, and identical components are given the same reference numbers in FIGS. 1 and 2. Thus, in system 70, a plurality of cheese components and additives are fed to blender 12, which discharges a homogenous raw material mixture in condition for cooking, and that discharge is conducted to cooking subsystem 72. From subsystem 72, the cooked, cheese mass is conducted through line 34, which carries the cheese mass through control subsystem 36 and to balance tank 40. From that tank 40, the cheese is conducted to filling station 42 and thence to palletizer 44.

The principal difference between systems 10 and 70 is that in the former system, the cheese mass continuously moves through cooking subsystem 22, while in the latter system, a batch of cheese mass is collected and cooked in one or more vessels 74. Preferably, as illustrated in FIG. 2, a set of at least two parallel batch vessels 74 operate alternately to feed the molten cheese continuously through the on-line moisture measuring and control system 36 and to the filling station 42.

Figure 3:
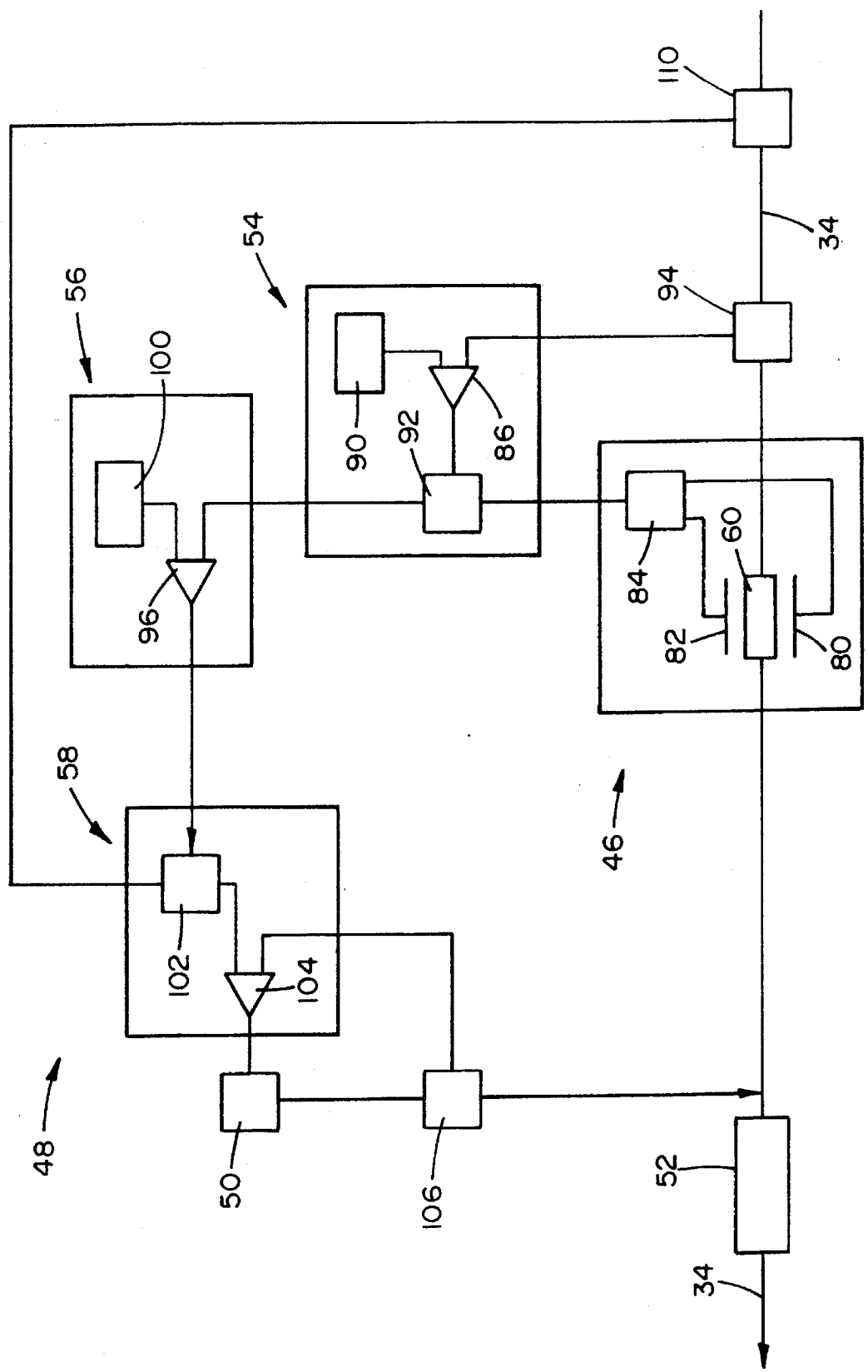
FIG. 3 is a schematic diagram of a moisture control subsystem of the processing systems of FIGS. 1 and 2.

FIG. 3 illustrates in greater detail a preferred embodiment of control subsystem 36. With reference to FIG. 3, measuring means 46 includes measuring cell 60, microwave transmitter 80, microwave receiver 82, and processor 84; signal processing means 54 includes comparator 86, set-point generator 90, processor 92, and sensor or probe 94. Control signal generating means 56 includes comparator 96 and variable strength signal generator 100; and dosing control means 58 includes processor 102, comparator 104, flowmeter 106, and flowmeter 110.

Figure 4:
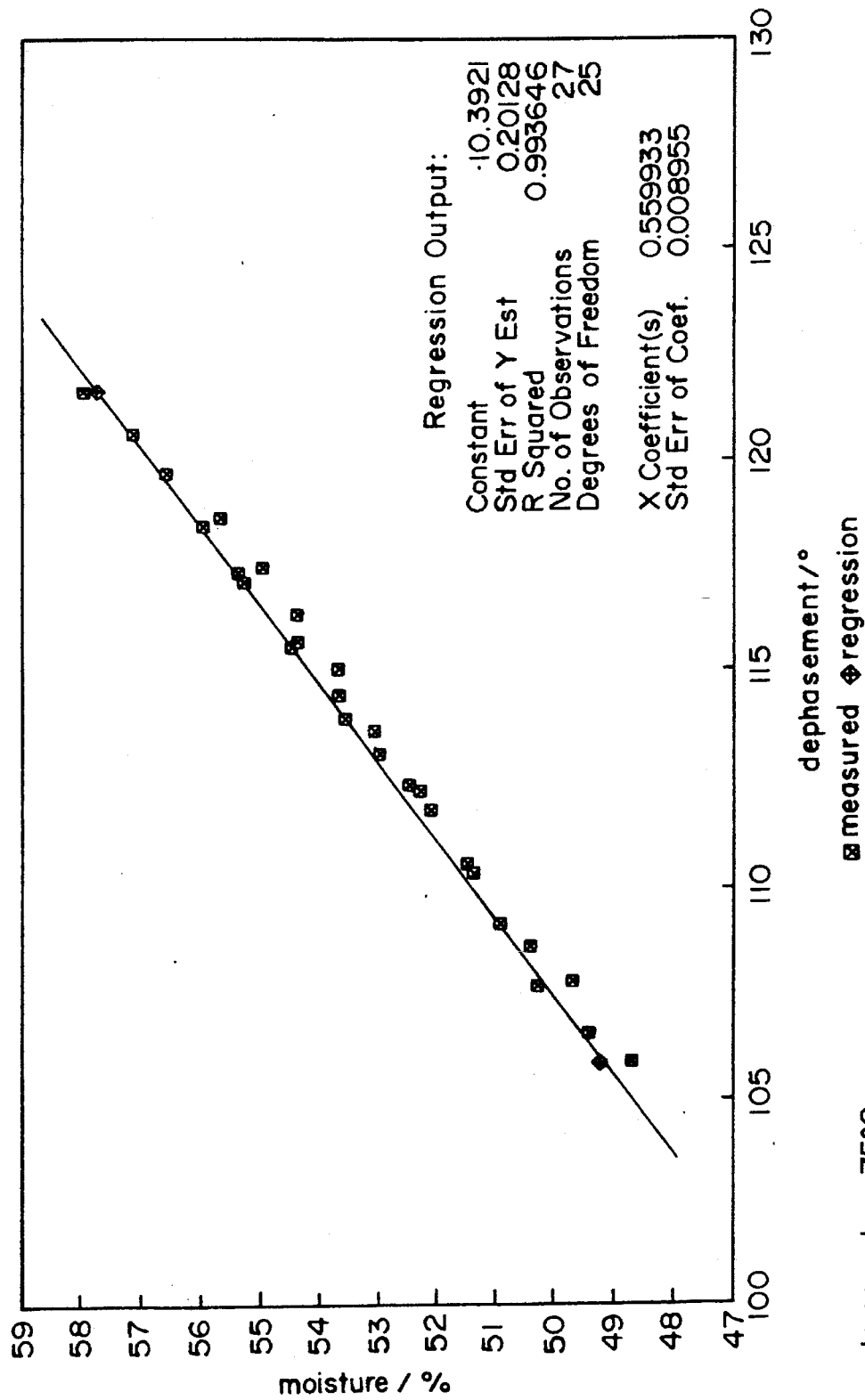
FIG. 4 is a chart illustrating the relationship between the moisture content of a cheese product and the phase shift of microwave signals transmitted through that cheese product.

Transmitter 80 and receiver 82 are positioned on opposite sides of flow through measuring cell 60; and, in use, transmitter 80 generates microwave signals and transmits those signals across flow through cell 60, to receiver 82. The microwave signals have a periodic, sinusoidal wave form or pattern, and the phase of the wave form is shifted as it passes through measuring cell 60 and the cheese product therein. In fact, with reference to FIG. 4, the extent to which the cheese product causes the phase of the microwave to shift is linearly related to the moisture content of the cheese product, and thus this phase shift provides a direct indication of that moisture content.

Processor 84 is provided to generate microwave signals that are to be transmitted through the cheese product, to evaluate the measured microwave signals, and to process all data to a final continuous output signal representing the moisture content of the cheese product. This evaluation and electronic processing is based on a product specific calibration curve completed using flow-through cell 60. The following simplified equation for electronic processing in processor 84 applies for a constant geometry of the flow-through cell and for a constant product density (in practice constant density may mean constant temperature and constant pressure):

$$MC(\%) = A \cdot \emptyset + B \quad (1)$$

where
MC: Moisture Content in %,
A: Calibration factor,
$\emptyset$: Measuring signal = phase shift, and
B: Calibration constant (depending on salt content).

The calibration constant B can be expressed in terms of the salt content of the cheese product according to the following equation:

$$B = B_1 \cdot SC + Bo \quad (2)$$

where SC is the salt content of the cheese product. Substituting the right hand side of equation (2) for B in equation (1) yields:

$$MC(\%) = A \cdot \emptyset + B_1 \cdot SC + Bo \quad (3)$$

Generally, signal processing means 54 corrects the output signal provided by processor 84 according to actual values of the temperature and/or pressure measured in the conduit 34 by means of relevant probe(s) 94. This compensation may become necessary, if the density of the product effected by any of these process parameters varies outside of a specified range.

More specifically, comparator 86 is provided to compare the actual signal(s) delivered by probe(s) 94 with pre-set signal(s) generated by a set-point generator 90 for temperature and/or pressure, and to generate output signal(s) representing the difference between the actual values and the set values. Processor 92 is provided to correct the signal produced by measuring means 46 for moisture content, considering the output signal from comparator 86 according to a pre-calibrated and pre-stored compensation curve, in order to deliver a corrected output signal to control signal generating means 56.

The corrected moisture content signal is determined by processor 92 according to the following equations:

$$MC(\%) = A \cdot \emptyset + B(po, To) + \Delta MC(p) + \Delta MC(T), \quad (4)$$

$$MC(\%) = A \cdot \emptyset + B(po, To) + CP \cdot (p \cdot po) + Dp + CT \cdot (T - To) + DT \quad (5)$$

where
MC(%): Moisture content in %,
A: Calibration factor,
$\emptyset$: Phase shift,
B: Calibration constant (depending on salt content, see equation (3)) at a pre-set pressure po and/or at a pre-set temperature To,
$\Delta MC(p)$: Deviation, correction of moisture content due to $p \neq po$,
$\Delta MC(T)$: Deviation, correction of moisture content due to $T \neq To$,
Cp, CT: Compensation factor for pressure and/or temperature compensation,
Dp, DT: Compensation constants for pressure and/or temperature compensation
p: Pressure, measured by pressure gauge 94,
T: Temperature, measured by temperature gauge 94,
po: Pre-set pressure, and
To: Pre-set temperature.

Comparator 96 is provided to generate an output signal indicating whether, and the extent to which, the moisture content of the cheese product is above or below a desired value. More specifically, the output of processor 92 is transmitted to a first input of comparator 96, and a second input of the comparator 96 is connected to and receives a signal from a variable strength signal generator 100, which is used to generate a signal representing the desired moisture content of the cheese product. Comparator 96 compares the two signals transmitted to its inputs, and generates an output signal representing the difference between those two input signals. The output signal from comparator 96 is then used to adjust the moisture content of the cheese product to the preferred level.

As a practical matter, it is normally easier to add moisture to than to remove moisture from the cheese product. Thus, preferably, systems 10 and 70 are designed and operated so that the moisture content of the cheese product is slightly below the desired level when the cheese product passes through conduit 34, and moisture is added to that product at or downstream of that point to increase that moisture content to the desired level. The measuring and control of the moisture content of the cheese product can be performed at any point in systems 10 and 70 depending, for example, on specific technical and local needs or conditions. In general, there are two possibilities for measuring and controlling the moisture content: (i) upstream measurement combined with downstream correction of moisture content, by, for instance, water injection, and (ii) upstream correction combined with downstream measurement.

As a general matter, the former arrangement, upstream-measurement/downstream correction, is preferred; and with this arrangement, the signal from comparator 96 indicates that the moisture content of the cheese product is below the preferred level. This signal combined with the output signal of flowmeter 110 indicating the actual flowrate, preferably the mass-flowrate in conduit 34, is processed in processor 102 to a signal which indicates the amount of moisture that needs to be added to the cheese product to raise the moisture content thereof to that preferred level.

Processor 102 may generate this signal according to the following equation:

$$mw = (MC_o - MC) \cdot mpc \quad (6)$$

where
mw: Mass flow rate of water to be added, mpc: Mass flow rate of processed cheese measured by sensor 110, MC: Moisture content calculated by equations (1), (3), and (5), and $MC_o$: Pre-set moisture content, target value for product.

Comparator 104 is provided to compare the signal from processor 102 and a flowrate signal delivered by flowmeter 106 and representing the actual amount of liquid added to the product in conduit 34, and to generate an output signal which may be used in any suitable manner to add liquid to the cheese product. For example, the output signal may be conducted to a pump controller integrated in liquid dosing system 50 that, in turn, operates a pump to add liquid to the cheese product. Alternatively, the output signal may be conducted to a valve controller integrated in the liquid dosing system 50 that adjusts the position of a valve in a fluid input line to increase or decrease the amount of fluid added to the cheese product.

The signals for the pump controller or the valve controller may be generated in accordance with the following equations:

f. pump controller: $n = En \cdot (m_W - m_{WM}) + F_W$     (7)

f. valve controller: $x = Ex \cdot (m_W - m_{WM}) \cdot F_X$     (8)

where mw: Mass flow rate of water calculated by equation (6), mwM: Mass flow rate of water measured by the flow meter 106, n: Rotational speed of pump, X: Controller output for valve En/Ex: Control factors for pump/valve controller, and Fn/Fx: Control constants for pump/valve controller.

Preferably, sterile water or whey is mixed into the product in conduit 36 to increase the moisture content thereof, and then the cheese product is passed through a dynamic or static mixer 52. As will be understood by those or ordinary skill in the art, any suitable mixer 52 may be used to mix the added water or whey with the cheese products.

An advantage of the preferred upstream measurement/downstream correction arrangement is the potential of achieving the highest accuracy available for moisture control. The alternative approach, upstream correction/downstream measurement, simplifies the control set-up, however the achievable accuracy for moisture control is lower than that provided by the upstream measurement/downstream correction arrangement described above. In the alternative upstream correction/downstream measurement system, the water is injected and mixed into the cheese product prior to moisture measurement. This can be at any appropriate point of the processing line such as after flash cooling or directly into the flash tank. This set-up makes any measurement of flowrates redundant and thus unnecessary.

Figure 5:
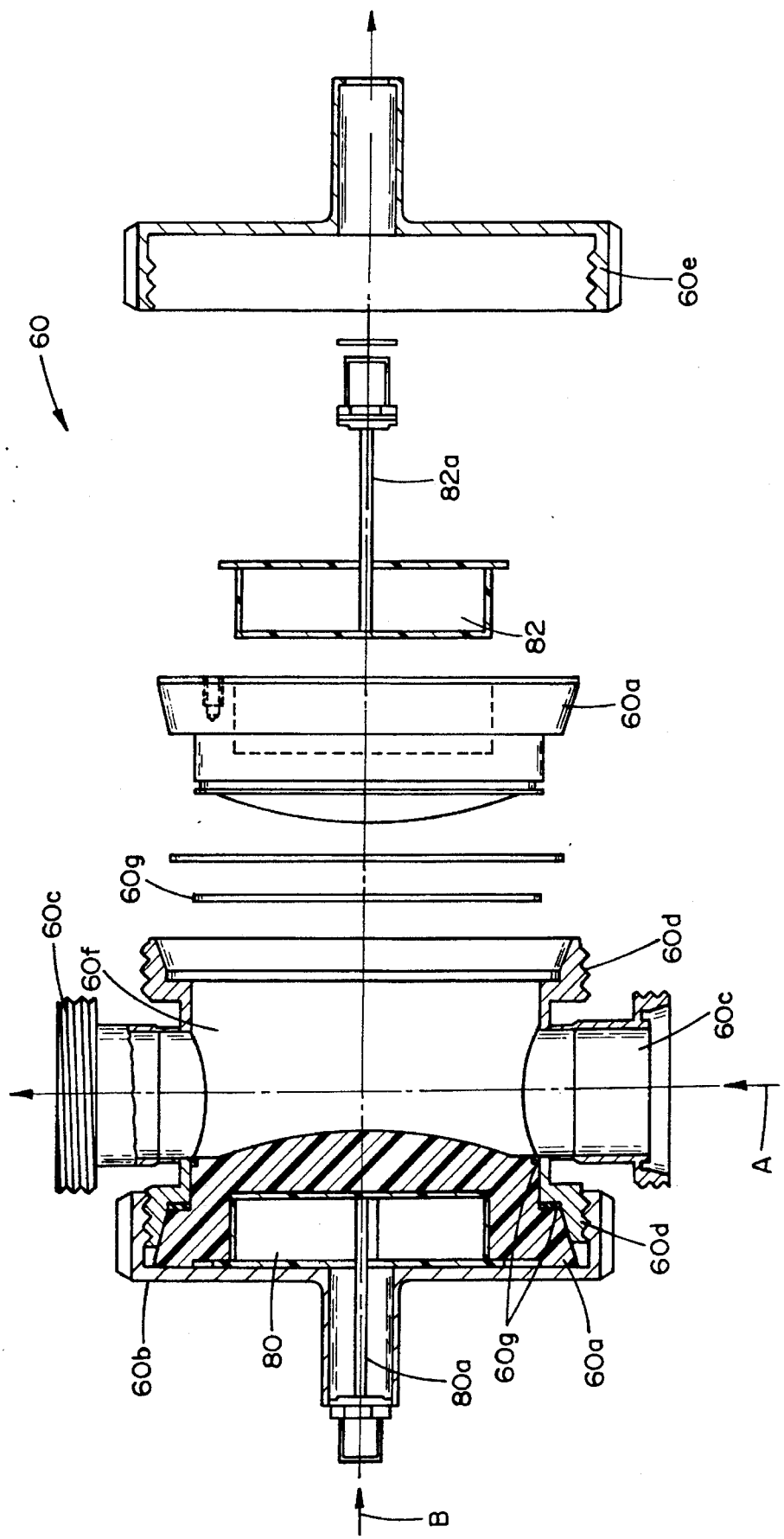
FIG. 5 illustrates the flow through measuring cell, in a partially disassembled condition, used in the moisture control subsystem.
Figure 6:
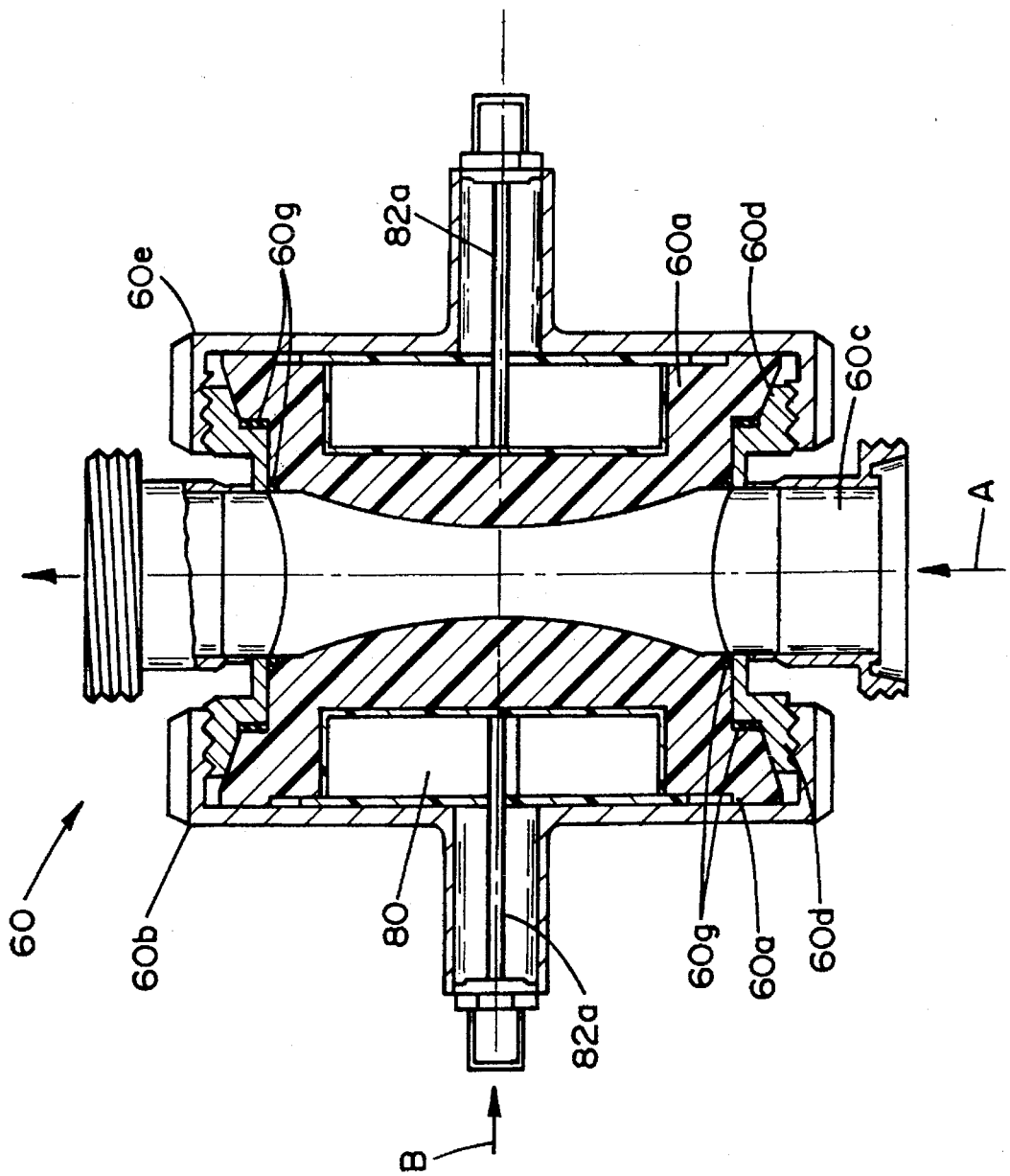
FIG. 6 shows the flow through measuring cell in an assembled condition.

FIGS. 5 and 6 illustrate in greater detail flow-through measuring cell 60 as it is combined with microwave transmitter 80 and receiver 82. Generally, cell 60 includes windows 60a, internal casing 60b, end connectors 60c, outside housing 60d, end closures 60e, and seals 60g. Preferably, flow-through cell 60 is a pressure stable construction, with parts 60b, 60c, 60d, and 60e made of metal, preferably stainless steel or Teflon coated stainless steel, and with parts 60a and 60g made of non-metal. This construction allows fluids, in this specific case, processed cheeses, to be pumped through the cell along a flow-axis A, which is preferably arranged vertically as shown in FIG. 5 in order to remove air from the cell and achieve filling of the cell by 100%. In the product flow direction A, the cell is connected into conduit 36 on both ends 60c. These connections may be maintained by means of welding or any suitable commercially available pipe fitting system.

Microwave transmission axis B is arranged perpendicular to the product flow direction A. Along axis B, microwave transmitter 80 and microwave receiver 82 are disposed within a non-metal microwave-conductive window 60a. This material may be any microwave-conductive material which is also suitable in connection with the product and cleaning and disinfection solutions to be pumped through the cell, such as polycarbonates (Macrolon), polyamides, polacetates, (Erthalon) or Teflon. Preferably microwave antennae 80 and 82 are integrated into measuring windows 60a using means such as screws of suitable size, in order to have a compact and stable arrangement, to avoid water condensation between antennae and the windows, and to minimize the attenuation of microwaves by the window material.

The windows 60a have a convex form, or lens shape, on the product side, which is symmetrical around axis B. In this way, the windows minimally interfere with the flow of the product through the measuring cell by means of a large hydraulic diameter and a minimum pressure drop along the cell. In addition, the lens shape avoids edges in the flow-path of the product, facilitating the in place cleaning of the cell by a solution of cleaning agents or rinsing water after the production. Furthermore, the lens shape provides a focusing effect of the microwaves, improving the performance of the measuring system. The sealings 60g prevent product from flowing out of the cell through the gap between windows 60a and metal housing 60d. This arrangement ensures, as a whole, that there is no direct contact between the product and the measuring system.

Each of the units of cell 60 includes one measuring window 60a, and one of the integrated antenna 80 or 82 is attached to each of the metal housings 60d, on each side of the flow through cell by means of screw-on closing parts 60e. The screw on closing parts 60e protect the antennae 80 and 82 from splashing water or any liquids. Moreover, cell 60 is formed so that the microwave cables 80a, 82a, including the connection parts, are stabilized against vibrations and any other mechanical stressing. Thus, the whole flow-through cell 60, including the antennae 80 and 82, forms a single compact unit that maintains a tight flow-through path for the product with a consistent and defined geometry.

FIG. 6 shows flow through cell 60 assembled. The preferred distance C between the windows 60a is an important design parameter, determined, in part, by the salt and moisture content of the cheese product. For example, in an embodiment of the invention that has been actually reduced to practice, a distance of 2.5 cm between the windows has been found to produce effective results.

As discussed above, FIG. 4 illustrates the correlation between moisture content of the cheese product and the phase-shift of microwaves transmitted through this product using flow through cell 60. This correction is valid for a constant density of the product. Density changes due to temperature and pressure can be compensated for by means of the preferred control method and system described above and illustrated on FIG. 3.

Figure 7:
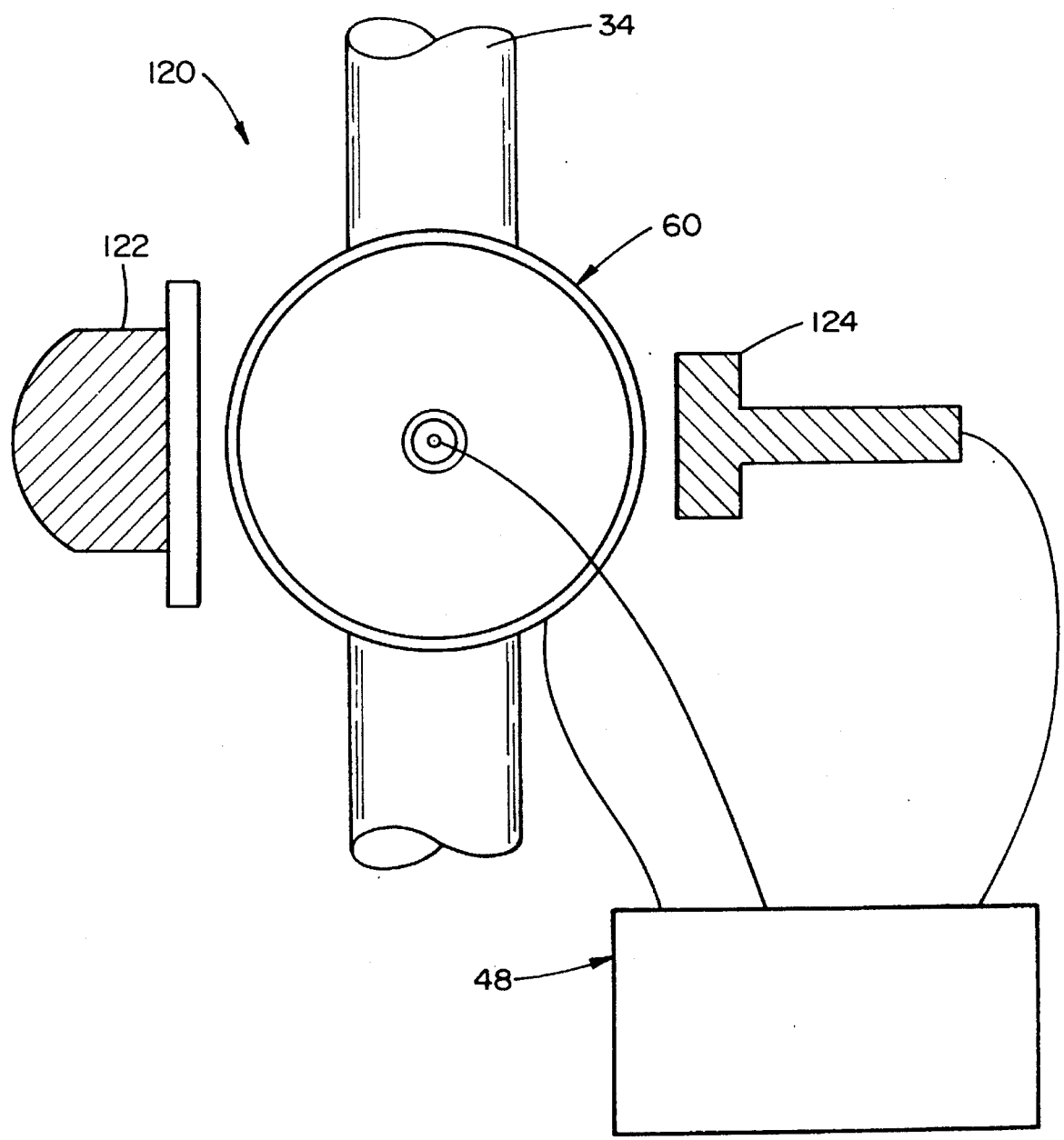
FIG. 7 shows a microwave measuring means including the flow through measuring cell of FIGS. 5 and 6 and a radiometric density measuring instrument.

In some cases, such as when an inhomogeneous product is conducted through line 34, it may be preferred to use a direct on-line density measuring system to measure the density of the product flowing through line 34. FIG. 7 illustrates a radiometric system 120 that may be used for this purpose. In this arrangement, the flow-through measuring cell 60 is combined with a radiometric source 122 and a scintillation detector 124 which transmit γ-rays through the product in a direction perpendicular to the axis of the microwave transmission.

More specifically, instrument 120 may be used to generate an output signal representing the density of the cheese product, and this output signal is combined with the output signal of the microwave system and may be converted to a final corrected signal representing or indicating the moisture content of that cheese product. This conversion is carried out according to the following equation:

$$MC = \frac{A \cdot \phi}{\ln \frac{lo}{l}} + B$$

where
- ln: natural logarithm,
- MC: Moisture content in %,
- A: Calibration factor,
- Ø: Measuring signal= phase shift,
- B: Calibration constant,
- lo: Intensity on the unattenuated radiation, and
- l: Intensity of radiation.

This final signal, in turn, may be used to control the operation of a subsystem employed to add enough moisture to the cheese product to adjust the moisture content thereof to the desired level.

It should be noted that the present invention may be used with a variety of types of cheese products in addition to the specific examples described above. For example, this invention may also be used with cream cheese and with processed cheese.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A method for processing cheese, comprising:
   blending cheese with additional ingredients to form a blended cheese material;
   cooking the blended cheese material;
   cooling the blended cheese material;
   measuring a moisture content of the blended cheese material;
   generating a signal representing said moisture content; and
   adjusting said moisture content, in response to said signal, to a preset level;
   wherein the measuring step includes the steps of
   i) continuously conducting the blended cheese material through a conduit, and
   ii) continuously measuring the moisture content of the blended cheese material passing through the conduit;
   the generating step includes the step of continuously generating a moisture content signal representing the moisture content of the blended cheese material passing through the conduit; and
   the adjusting step includes the steps of
   i) generating an adjustment signal representing the difference between the moisture content of the blended cheese material and a desired moisture content level, and
   ii) using the adjustment signal to adjust the moisture content of the blended cheese material to the desired moisture content level.

2. A method according to claim 1, for use with a cheese processing line, and wherein the step of measuring a moisture content of the blended cheese material includes the step of measuring said moisture content at any selected location of the cheese processing line.

3. A method according to claim 1, wherein the measuring step is performed after the cooling step.

4. A method according to claim 1, wherein the measuring step includes the steps of:
   generating a microwave signal having a phase;
   transmitting the microwave signal through the blended cheese material, wherein the cheese material shifts the phase of the microwave signal; and
   measuring the phase shift of the microwave signal.

5. A method according to claim 4, further including the steps of:
   positioning a microwave transmitter on a first side of the conduit; and
   positioning a microwave receiver on a second side of the conduit.

6. A method according to claim 5, wherein:
   the conducting step includes the step of conducting the blended cheese material through a flow-through measuring cell;
   the step of positioning the microwave transmitter includes the step of positioning the transmitter on a first side of the measuring cell; and
   the step of positioning the microwave receiver includes the step of positioning the receiver on a second side of the measuring cell.

7. A method according to claim 1, further including the step of maintaining the moisture content of the cheese material below the preset level prior to the measuring step, and wherein the adjusting step includes the step of adding a liquid to the cheese material to increase the moisture content thereof substantially to the preset level.

8. A method according to claim 1, wherein:
   the adjusting step further includes the steps of
   iii) generating a set point signal representing the desired moisture content level, and
   iv) comparing the moisture content signal to the set point signal; and
   the step of generating the adjustment signal includes the step of generating an adjustment signal representing the difference between the moisture content signal and the set point signal.

9. A method according to claim 8, wherein:
   the step of generating a signal representing the moisture content of the blended cheese material includes the steps of
   i) generating a raw signal representing a raw measurement of said moisture content,
   ii) determining a value for a variable parameter of the blended cheese material, and
   iii) processing said raw signal and said determined value according to a predetermined procedure to produce a corrected signal representing said moisture content; and
   the comparing step includes the step of comparing said corrected signal to the set point signal.

10. A method according to claim 9, wherein the variable parameter comprises at least one of a temperature, a pressure and a density of the blended cheese material.

11. A method according to claim 1, wherein the step of using the adjustment signal to adjust the moisture content of the blended cheese material includes the steps of:

determining a value for a flow-rate of the blended cheese material;

processing said determined value and the adjustment signal according to a predetermined procedure to produce a corrected adjustment signal indicating an amount of moisture that needs to be added to the blended cheese material to adjust the moisture content thereof to the desired level; and adding said indicated amount of moisture to the blended cheese material.

12. A method for processing cheese, comprising:

blending cheese with additional ingredients to form a blended cheese material;

cooking the blended cheese material;

cooling the blended cheese material;

measuring a moisture content of the blended cheese material; and if the measured moisture content is below a predetermined value, then adding a liquid to the blended cheese method;

wherein the measuring step includes the steps of
i) continuously conducting the blended cheese material through a conduit,
ii) continuously measuring the moisture content of the blended cheese material passing through the conduit, and
iii) continuously generating a moisture content signal representing the moisture content of the blended cheese material passing through the conduit; and the adding step includes the steps of
i) generating an adjustment signal representing the difference between the moisture content of the blended cheese material and a desired moisture content level, and
ii) using the adjustment signal to adjust the moisture content of the blended cheese material to the desired moisture content level.

13. A method according to claim 12, wherein the measuring step occurs after the cooling step.

14. A method according to claim 12, further comprising the step of conducting the blended cheese material in a downstream direction through a processing system, and wherein:

the measuring step includes the step of measuring the moisture content of the blended cheese material at a given location in the processing system; and the adding step including the step of adding the liquid to the blended cheese material at a location downstream of said given location.

15. A method according to claim 12, further comprising the step of conducting the blended cheese material in a downstream direction through a processing system, and wherein:

the adding step includes the step of adding the liquid to the blended cheese material at a given location in the processing system; and the measuring step includes the step of measuring the moisture content of the blended cheese material at a location downstream of said given location.

16. A method according to claim 12, wherein:

the adding step further includes the steps of iii) generating a set point signal representing the desired moisture content level, and
iv) comparing the moisture content signal to the set point signal; and the step of generating the adjustment signal includes the step of generating an adjustment signal representing the difference between the moisture content signal and the set point signal.

17. A method according to claim 16, wherein:

the step of generating a signal representing the moisture content of the blended cheese material includes the steps of
i) generating a raw signal representing a raw measurement of said moisture content,
ii) determining a value for a variable parameter of the blended cheese material, and
iii) processing said raw signal and said determined value according to a predetermined procedure to produce a corrected signal representing said moisture content; and the comparing step includes the step of comparing said corrected signal to the set point signal.

18. A method according to claim 12, wherein the step of using the adjustment signal to adjust the moisture content of the blended cheese material includes the steps of:

determining a value for a flow rate of the blended cheese material;

processing said determined value and the adjustment signal according to a predetermined procedure to produce a corrected adjustment signal indicating an amount of moisture that needs to be added to the blended cheese material to adjust the moisture content thereof to the desired level; and adding said indicated amount of moisture to the blended cheese material.

19. A method for processing cheese, comprising:

blending cheese with additional ingredients to form a blended cheese material;

conducting the blended cheese material through a processing system to cook and cool the blended cheese material;

measuring a moisture content of the blended cheese material; and discharging from the processing system blended cheese material having a moisture content outside a given range;

wherein the measuring step includes the steps of
i) continuously conducting the blended cheese material through a conduits,
ii) continuously measuring the moisture content of the blended cheese material passing through the conduit, and
iii) continuously generating a moisture content signal representing the moisture content of the blended cheese material passing through the conduit; and the discharging step includes the step of discharging from the processing system a quantity of the blended cheese material if said quantity of the blended cheese material has a measured moisture content outside said given range.

20. A system for processing cheese, comprising:

blending means to blend cheese with additional ingredients to form a blended cheese material;

means to cook the blended cheese material;

means to cool the blended cheese material; and a moisture control subsystem to measure a moisture content of the blended cheese material and selectively to adjust said moisture content to a preset level;

wherein the blending means, the cooking means, the cooling means and the moisture control subsystem form a cheese processing line, and the moisture control subsystem includes i) a conduit forming a part of the cheese processing line and defining a passageway for continuously conducting the blended cheese material through said part of the cheese processing line, ii) measuring means located adjacent, and completely outside, said passageway for continuously measuring the moisture content of the blended cheese material passing through said passageway without interfering with the flow of the blended cheese material through said passageway, and to generate a moisture content signal representing the moisture content of the blended cheese material, iii) means to generate an adjustment signal representing the difference between the moisture content of the blended cheese material and a desired moisture content level, and iv) means for using the adjustment signal to adjust the moisture content of the blended cheese material to the desired moisture content level.

21. A system according to claim 20, wherein:

the moisture control subsystem further includes a flow through measuring cell to receive the blended cheese material from the means to cool the blended cheese material; and the measuring means is located adjacent said flow through measuring cell and measures the moisture content of the blended cheese material in said measuring cell.

22. A system according to claim 21 wherein the flow-through measuring cell is a pressure-stable construction made of metal and non-metal parts.

23. A system according to claim 22, wherein:

the measuring means includes a microwave transmitter and a microwave receiver; and the microwave transmitter and receiver are integrated in the flow-through measuring cell, and the microwave transmitter and receiver and the flow-through cell form one compact unit.

24. A system according to claim 21, wherein:

the flow-through measuring cell forms a flow path; and the flow path is adapted to blend cheese materials in terms of geometry, design, and dimensions.

25. A system according to claim 21, wherein the measuring means includes:

a microwave receiver located on a first side of the measuring cell; and a microwave transmitter located on a second side of the measuring cell to generate microwave signals and to transmit the microwave signals through the cheese material in the measuring cell and to the microwave receiver.

26. A system according to claim 25, wherein:

the microwave signals have a phase; and the measuring means further includes means to measure a difference between the phase of the microwave signals generated by the microwave transmitter and the phase of the microwave signals received by the microwave receiver.

27. A system according to claim 20, wherein the means to generate the adjustment signal includes:

means to generate a set point signal representing the desired moisture content level;

means to compare the moisture content signal to the set point signal; and means to generate an adjustment signal representing the difference between the moisture content signal and the set point signal.

28. A system according to claim 27, wherein:

the measuring means includes i) means to generate a raw signal representing a raw measurement of said moisture content, ii) means to determine a value for a variable parameter of the blended cheese material, and iii) a processor to process said raw signal and said determined value according to a predetermined procedure to produce a corrected signal representing said moisture content; and the means to compare includes means to compare the corrected signal to the set point signal.

29. A system according to claim 20, wherein the means for using the adjustment signal to adjust the moisture content of the blended cheese material includes:

means to determine a value for a flow rate of the blended cheese material;

means to process said determined value and the adjustment signal according to a predetermined procedure to produce a corrected adjustment signal indicating an amount of moisture that needs to be added to the blended cheese material to adjust the moisture content thereof to the desired level; and means to add said indicated amount of moisture to the blended cheese material.

\* \* \* \* \*